(12) United States Patent
Deschenes et al.

(10) Patent No.: US 6,837,148 B1
(45) Date of Patent: Jan. 4, 2005

(54) COOKING AID DEVICE

(75) Inventors: Laurent Deschenes, Saint-Germain-la-Bianche-Herbe (FR); Anne-Maria Piolet, Saint Aubin sur Mer (FR)

(73) Assignee: SEB S.A., Ecully (FR)

( * ) Notice: Subject to any disclaimer, the term of this patent is extended or adjusted under 35 U.S.C. 154(b) by 404 days.

(21) Appl. No.: 10/088,361

(22) PCT Filed: Sep. 15, 2000

(86) PCT No.: PCT/FR00/02556

§ 371 (c)(1),
(2), (4) Date: Mar. 18, 2002

(87) PCT Pub. No.: WO01/22780

PCT Pub. Date: Mar. 29, 2001

(30) Foreign Application Priority Data

Sep. 17, 1999 (FR) .............................................. 9911810

(51) Int. Cl.[7] .............................. A23L 1/00; H05B 1/02
(52) U.S. Cl. .............................. 99/325; 99/468; 99/486
(58) Field of Search ........................... 99/325–333, 348, 99/509–513, 467, 468, 486–492, 483; 366/314, 601; 241/37.5, 92, 282.1, 282.2; 219/492, 494–497, 481, 412, 413, 506, 501, 702

(56) References Cited

U.S. PATENT DOCUMENTS

| 4,487,116 A | * | 12/1984 | Routhier ....................... 99/339 |
| 4,693,610 A | * | 9/1987 | Weiss .......................... 366/146 |
| 5,088,389 A | * | 2/1992 | Labadia del Fresno ....... 99/327 |
| 5,353,697 A | * | 10/1994 | Venturati et al. ............. 99/492 |
| 5,723,847 A | * | 3/1998 | Boldt .......................... 219/506 |
| 6,340,124 B1 | * | 1/2002 | Charles et al. ............. 241/37.5 |
| 6,588,322 B2 | * | 7/2003 | Pavlovic et al. .............. 99/331 |
| 6,640,694 B2 | * | 11/2003 | Brezovnik et al. ............ 99/348 |

FOREIGN PATENT DOCUMENTS

| DE | 40 10 998 | 10/1991 |
| EP | 0 660 047 | 6/1995 |

* cited by examiner

Primary Examiner—Timothy F. Simone
(74) Attorney, Agent, or Firm—Young & Thompson

(57) ABSTRACT

The invention relates to a device for assisting in culinary preparation, comprising a plurality of electric household appliances (10, 20, 30) and a remote monitoring and control apparatus (2). According to the invention, the user can select a prerecorded culinary preparation that is modeled as a sequence of steps of preparation and, in the course of at least one step, the monitoring and control apparatus (2) receives a condition signal SE from certain of the electric household appliances, and emits toward certain others a control signal SC dependent on the one hand on condition signals SE and on the other hand of prerecorded operational parameters.

4 Claims, 1 Drawing Sheet

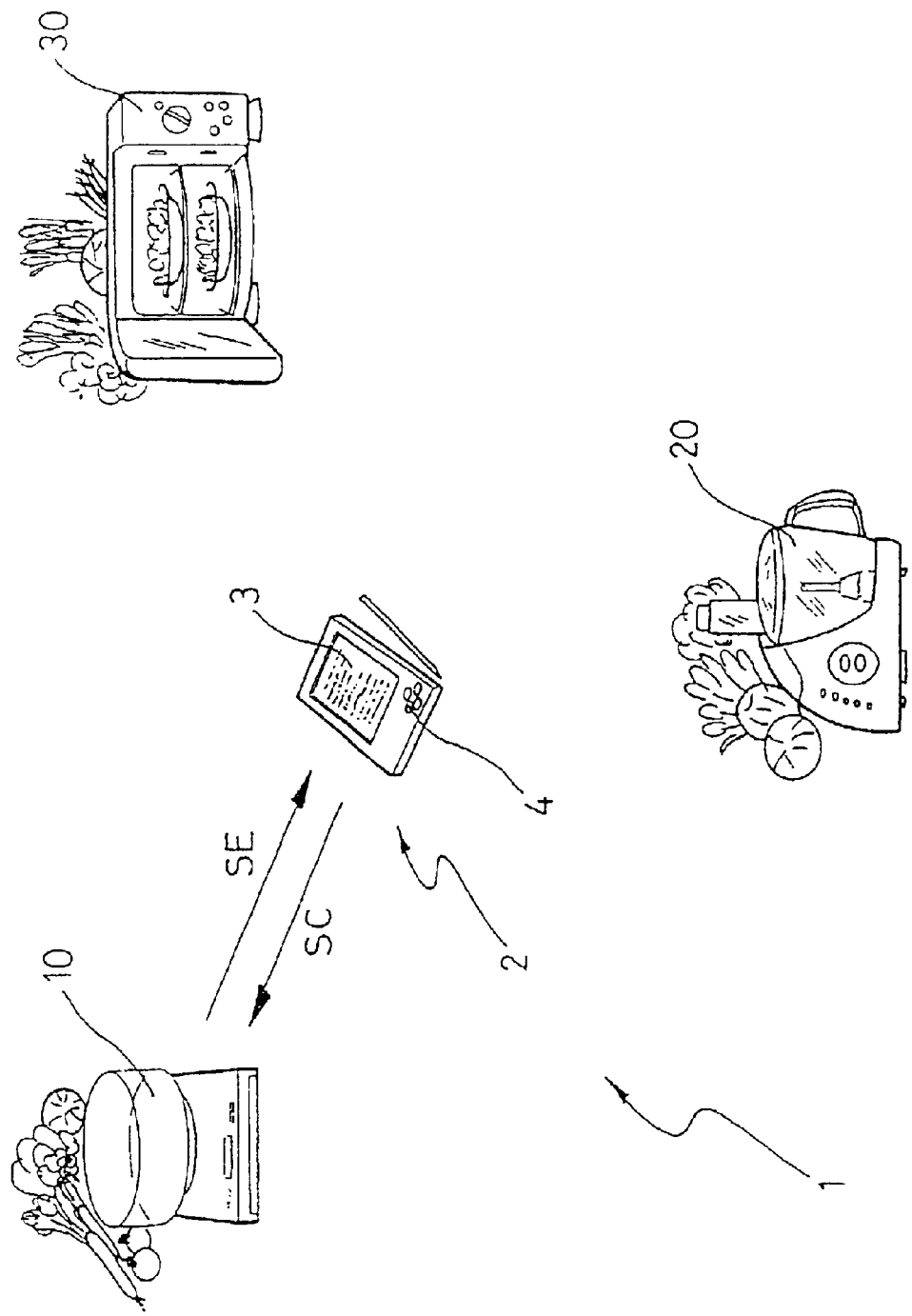

COOKING AID DEVICE

The invention relates to a device for assisting in cooking preparation and to a process used in such a device; it relates to the field of electric household devices.

The invention has for its principal object to enable the user to have a choice of cocking recipes and to guide him in the preparation of these recipes, by simplifying the use of electric household appliances necessary for the preparation.

To do this, the invention provides a process for assisting in cooking preparation, consisting in aiding a user to produce a prerecorded culinary preparation of his choice by means of a plurality of electric household appliances and a monitoring and control apparatus, which process comprises the following steps:

the user selects a cooking preparation in the monitoring and control apparatus;

the monitoring and control apparatus displays its steps for the production of the selected cooking preparation;

at the beginning of at least one step for producing the culinary preparation, the monitoring and control apparatus receives a signal indicating the condition of at least one of the electric household appliances;

during at least one step of producing the culinary preparation, the monitoring and control apparatus emits a control signal toward at least one of the electric household apparatus;

at the end of each step of producing the culinary preparation, the monitoring and control apparatus receives an end-of-step signal.

A device is also provided by the invention, which permits the practice of the process constituting the other object of the invention.

It is a device for assisting in culinary preparation, comprising a plurality of electric household appliances and apparatus for monitoring and remotely controlling said electric household appliances, the monitoring and control apparatus being provided with display means and selection means, and being adapted to receive condition signals characteristic of the condition of said electric household appliances and to emit control signals to them.

According to the invention, the selection means permit the user to select a culinary preparation which is prerecorded and modeled as a sequence of preparation steps, of which certain ones taken alone constitute an elementary assisted phase using a first group of electric household appliances and associating with each of them operating parameters, and in that, in the course of at least one assisted elementary phase, the monitoring and control apparatus receives a condition signal from each of the electric household appliances of a second group, and emits toward each of the electric household appliances of the first group a control signal dependent on the one hand on said condition signals and on the other hand on operation parameters associated with each of the electric household appliances of the first group and with said assisted elementary phase.

Other characteristics and advantages of the invention will become apparent from the following description, given by way of non-limiting example, with reference to the single figure, which shows schematically an assistance device according to the invention.

In the figure, there is shown a device 1 for assisting in culinary preparation, called "interactive", which comprises a plurality of electric household appliances 10, 20, 30 and a monitoring and control apparatus 2 for said electric household appliances. The monitoring and control apparatus 2 is provided with display means 3 and with selection means 4, which permit presenting respectively on a screen and on a keyboard, or can be gathered on a tactile screen which if desired is associated with a pointer. This type of apparatus is known and widely used in the form of pocket computers, operating with battery feed, rechargeable when the apparatus is placed on a base connected to a local electrical supply network. The apparatus is adapted to receive condition signals SE characteristic of the condition of the electric household apparatus 10, 20, 30 and to emit toward them control signals SC.

The selection means 4 permit a user to select a prerecorded culinary preparation modeled as a sequence of preparation steps. This modeling is accessible to the user, either by being memorized directly in the monitoring and control apparatus 20, or by data exchange with a remote server, to which the apparatus can be connected by any known suitable means, for example by means of a cable network.

The electric household appliances 10, 20, 30 are those which take part in the culinary preparation selected by the user: these are for example a food weighing apparatus 10, a food processor 20 and an oven 30.

Certain ones of the preparation steps, taken alone, in contrast to a purely manual prefatory phase to be carried out by the user without recourse to any of the electric household appliances at his disposal, constitute an assisted elementary phase using a first group of electric household appliances by associating operating parameters with each of them.

The first group of appliances can be comprised as the "active" group of appliances during said phase, which will be supposed in what follows by way of simplification, but can extend to any appliance receiving a control signal SC no matter what its nature, including a stop or blockage signal.

The modeling of the culinary preparation consists not only in the description and sequencing of the prefatory steps, as is used in a traditional presentation of a kitchen recipe, but also in carrying out, for a given assisted elementary phase, operating parameters for each electric household appliance that is active during this phase; these parameters can for example be a speed of rotation of the shaft of the food processor 20, a temperature and cooking time for the oven 30.

In the course of at least one assisted elementary phase, the monitoring and control apparatus 2 receives a condition signal SE from each of the electric household appliances 10, 20, 30 of a second group, and emits toward each of the electric household appliances of the first group a control signal SC dependent on the one hand on said condition signals SE and, on the other hand, on the operating parameters associated with each of the electric household appliances 10, 20, 30 of the first group and with said assisted elementary phase. The elaboration of control signals SC from the condition signals SE of certain appliances permits taking account, in the course of instructions and the performance of the prefatory steps, of the previous steps and of the constraints due to the appliances 10, 20, 30. For example, it can be provided that the monitoring apparatus 2 can emit a heating command to the oven 30 only when the oven 30 is powered, and that the previous step using the processor 20 has been carried out. The performance of the prior step can be signaled by the condition—"stopped" consecutive to the lapse of a predetermined actuation time—of the processor 20, or else by an action of the user. If this cooking step in the oven 30 is considered to be the last step in a given culinary preparation, the oven 30 constitutes the "active" apparatus —of the first group—, and the processor as well as the oven the appliances in the second group, which is to say whose condition is controlled before emission by the monitoring and control apparatus 2 of a control signal SC to the "active" apparatus. It will be seen that one or several appliances can both take part in the first and second group of appliances, which is to say be monitored before receiving a control signal.

According to a particular characteristic of the invention, the electric household appliances 10, 20, 30 and the monitoring and control apparatus 2 are connected by a cable network, by which are transmitted the condition signals SE and the control signals SC. The cable network can be the electric supply network itself, an internal network specifically dedicated to an assembly of household appliances, or else a network used for telephones with the condition that the electric household appliances 10, 20, 30 be provided with a modem.

Alternatively, or in combination, the condition signals SE or the control signals SC are optical signals, which are for example transmitted by a cable network of optical fibers. In the present state of domestic equipment, and for considerations of cost, it is preferable to provide that the optical signals be of the infrared type with a cable-free mode of transmission.

The invention also provides a process which is particularly adaptable to be used with a device for assisting in culinary preparation of the type which will be described.

Such a process for assistance in culinary preparation consists in helping a user produce a prerecorded culinary preparation of his choice by means of a plurality of electric household appliances 10, 20, 30 and with a monitoring and control apparatus 2. It comprises successively the following steps:

1. the user selects a culinary preparation on the monitoring and control apparatus 2;
2. the monitoring and control apparatus 2 displays the steps to be carried out for the selected culinary preparation; preferably, the display progresses taking account of the progress of the production of the recipe, by displaying the description of the step that is being performed;
3. at the beginning of at least one step for carrying out the culinary preparation, the monitoring and control apparatus 2 interrogates at least one of the electric household appliances 10, 20, 30 and receives a signal SE indicative of its condition; such an SE signal permits for example the monitoring and control apparatus 2 to determine whether said household appliance 10, 20, 30 is ready to operate, which is to say is powered;
4. during at least one step of production of the culinary preparation, the monitoring and control apparatus 2 emits a control signal SC to at least one of the electric household appliances 10, 20, 30; the control signal SC is emitted for example when the user selects, on the selection means 4, an operative instruction, the control signal SC containing the parameters of operation of the appliance 10, 20, 30 for the phase in question. It can relate for example to time and cooking temperature delivered to an oven 30;
5. at the end of each step of production of the culinary preparation, the monitoring and control apparatus 2 receives an end-of-step signal; this signal permits the monitoring and control apparatus 2 to make use of the information according to which a step in the preparation has been carried out, and to position itself in the process of preparation so as to provide the display, the operating parameters and the identity of the appliance to be interrogated;
6. the process ends when the preparation is achieved, or repeats step 3.

The invention, as has been seen, provides an interactive mode for the use of electric household appliances, in which the utilizer is the guide during all the progress of a preparation, the dialogue interface between the electric household appliances and the user being constituted by the monitoring and control apparatus and the electric household appliances being mutually influenced by means of the same monitoring and control apparatus.

If the process which has been described is used to produce a simple preparation requiring the intervention of three types of appliances, namely a food weighing scale 10, a processor 20 and an oven 30, the interactive character of the process can be illustrated as follows:

The user which has selected a prerecorded recipe, follows the instructions which are displayed on the screen 3 of the monitoring and control apparatus 2; the monitoring and control apparatus 2 interrogates the scales 10 so as to determine whether it is in operative condition: if not, a message indicate to the user that it is necessary to hook up this appliance 10; the monitoring apparatus 2 then indicates to the user that he must weight a certain quantity of foodstuff, the scales receiving for its part a target value of weight; when the user places the foodstuff on the scales 10, the latter emits weight data to the monitoring apparatus 2 which can dialog with the user as a function of these data; once the target value is reached and the product is withdrawn from the scale 10, the end of the first step is signaled to the monitoring apparatus 2, which permits triggering the beginning of the second step, during which the foodstuff must be treated in the food processor 20; the monitoring apparatus 2, which has received a condition signal SE indicating that the processor 20 is powered, delivers to it a control signal SC which consists of a speed of rotation of the knife and a start signal, after the user has confirmed the beginning of the phase; during this phase, the monitoring and control apparatus 2 can give to the oven 30 a preheating order, and then adjust the temperature of the oven 30 as a function of the time at which the user validates the beginning of the cooking phase, after the processor 20 has been stopped.

As can be seen, the invention opens a wide range of possibilities corresponding to more or less guided procedures, which permit the user, even if he is totally inexperienced in the use of electric household appliances and in the production of culinary recipes, to optimize the use of his electric household appliances.

What is claimed is:

1. Device for assisting in culinary preparation, comprising a plurality of electric household appliances (10, 20, 30) and a remote monitoring and control apparatus (2) for said electric household appliances (10, 20, 30), the monitoring and control apparatus (2) being provided with display means (3) and selection means (4), and being adapted to receive condition signals (SE) characteristic of the condition of said electric household appliances and to emit toward them control signals (SC), characterized in that the selection means (4) permit a user to select a prerecorded culinary preparation which is modeled as a series of steps of preparation, of which certain ones taken alone constitute an assisted elementary phase using a first group of electric household appliances by associating with each of them operating parameters, and in that, in the course of at least one assisted elementary phase, the monitoring and control apparatus (2) receives a condition signal (SE) from each of the electric household appliances of a second group, and emits toward each of the electric kitchen appliances of the first group a control signal (SC) dependent on the one hand on said condition signals (SE), and on the other hand on the operational parameters associated with each of the electric household appliances of the first group and with said assisted elementary phase.

2. Device for assistance in culinary preparations according to claim 1, characterized in that the electric household appliances (10, 20, 30) and the monitoring and control apparatus (2) are interconnected by a cable network, by which the condition signals (SE) and the control signals (SC) are transmitted.

3. Device for assisting in culinary preparation according to claim 1, characterized in that the condition signals (SE) or the control signals (SC) are optical signals.

4. Device for assistance in culinary preparation according to claim 1, characterized in that the plurality of electric household appliances (10, 20, 30) comprises at least one of the following appliances: electric food weighing appliance (10), food processor (20), oven (30).

* * * * *